United States Patent
Kim et al.

(10) Patent No.: US 10,779,030 B2
(45) Date of Patent: Sep. 15, 2020

(54) DISPLAY APPARATUS AND CONTROLLING METHOD THEREOF

(71) Applicant: SAMSUNG ELECTRONICS CO., LTD., Suwon-si, Gyeonggi-do (KR)

(72) Inventors: Min-chul Kim, Seoul (KR); Han-soo Seong, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/400,052

(22) Filed: Jan. 6, 2017

(65) Prior Publication Data
US 2017/0214960 A1    Jul. 27, 2017

(30) Foreign Application Priority Data
Jan. 21, 2016 (KR) .................. 10-2016-0007628

(51) Int. Cl.
*H04N 21/422* (2011.01)
*H04N 21/436* (2011.01)
(Continued)

(52) U.S. Cl.
CPC ....... *H04N 21/42203* (2013.01); *G10L 15/08* (2013.01); *G10L 15/22* (2013.01);
(Continued)

(58) Field of Classification Search
CPC ........... H04N 21/4828; H04N 21/4622; H04N 21/4722; H04N 21/812; H04N 21/4316; H04N 21/4334; H04N 21/84
See application file for complete search history.

(56) References Cited

U.S. PATENT DOCUMENTS

| 5,798,785 A * | 8/1998 | Hendricks .............. H04H 20/42 348/E5.002 |
| 7,793,326 B2 * | 9/2010 | McCoskey ......... H04N 7/17318 725/53 |

(Continued)

FOREIGN PATENT DOCUMENTS

| JP | 2007-201742 | 8/2007 |
| KR | 10-2010-0073429 | 7/2010 |

(Continued)

OTHER PUBLICATIONS

Search Report and Written Opinion dated Mar. 16, 2017 in counterpart International Patent Application No. PCT/KR2017/000254.
(Continued)

*Primary Examiner* — Hsiungfei Peng
(74) *Attorney, Agent, or Firm* — Nixon & Vanderhye P.C.

(57) ABSTRACT

A method of controlling a display apparatus is provided. The method of controlling a display apparatus includes acquiring channel information regarding a broadcast content that a user watched through a broadcast receiving apparatus that is connected to the display apparatus, in response to a voice keyword being input from the user, transmitting information regarding the input voice keyword and the channel information to an external server, from the external server, receiving content information related to the voice keyword among content information that is determined based on the channel information and provided by a broadcast content providing service that the user subscribes to and displaying the content information related to the received voice keyword.

14 Claims, 9 Drawing Sheets

(51) Int. Cl.

| | | |
|---|---|---|
| *H04N 21/439* | (2011.01) | |
| *H04N 21/44* | (2011.01) | |
| *H04N 21/482* | (2011.01) | |
| *H04N 21/654* | (2011.01) | |
| *H04N 21/658* | (2011.01) | |
| *H04N 21/8405* | (2011.01) | |
| *H04N 21/434* | (2011.01) | |
| *G10L 15/08* | (2006.01) | |
| *G10L 15/22* | (2006.01) | |
| *H04N 21/442* | (2011.01) | |
| *H04N 21/45* | (2011.01) | |

(52) U.S. Cl.
CPC . *H04N 21/42204* (2013.01); *H04N 21/42225* (2013.01); *H04N 21/42226* (2013.01); *H04N 21/4345* (2013.01); *H04N 21/4394* (2013.01); *H04N 21/43615* (2013.01); *H04N 21/44008* (2013.01); *H04N 21/4828* (2013.01); *H04N 21/654* (2013.01); *H04N 21/658* (2013.01); *H04N 21/8405* (2013.01); *G10L 2015/088* (2013.01); *G10L 2015/223* (2013.01); *H04N 21/44222* (2013.01); *H04N 21/4508* (2013.01)

(56) References Cited

U.S. PATENT DOCUMENTS

| | | | |
|---|---|---|---|
| 9,380,330 B2 | 6/2016 | Shin et al. | |
| 2005/0278336 A1* | 12/2005 | Ito | H04N 7/17318 |
| 2013/0042289 A1* | 2/2013 | Park | H04H 20/93 |
| | | | 725/115 |
| 2013/0091524 A1 | 4/2013 | Hong | |
| 2013/0152118 A1 | 6/2013 | Oh et al. | |
| 2013/0271659 A1 | 10/2013 | Na et al. | |
| 2014/0082647 A1 | 3/2014 | Verrilli et al. | |
| 2014/0196091 A1 | 7/2014 | Shin et al. | |
| 2014/0196092 A1 | 7/2014 | Chung et al. | |
| 2015/0125029 A1 | 5/2015 | Li | |
| 2015/0137959 A1 | 5/2015 | Kim et al. | |
| 2015/0201246 A1 | 7/2015 | Son et al. | |
| 2015/0289002 A1 | 10/2015 | Choi et al. | |
| 2016/0286256 A1 | 9/2016 | Shin et al. | |

FOREIGN PATENT DOCUMENTS

| | | |
|---|---|---|
| KR | 10-2013-0125200 | 11/2013 |
| KR | 10-2014-0089877 | 7/2014 |
| KR | 10-2015-0060801 | 6/2015 |
| KR | 10-2015-0115314 | 10/2015 |
| WO | 2015/188620 | 12/2015 |

OTHER PUBLICATIONS

Extended Search Report dated Apr. 4, 2017 in counterpart European Patent Application No. 17151879.8.
EP Examination Report for EP Application No. 17151879.8 dated Sep. 1, 2017.
EP Oral Proceedings issued Apr. 3, 2018 for EP Application No. 17151879.8.

* cited by examiner

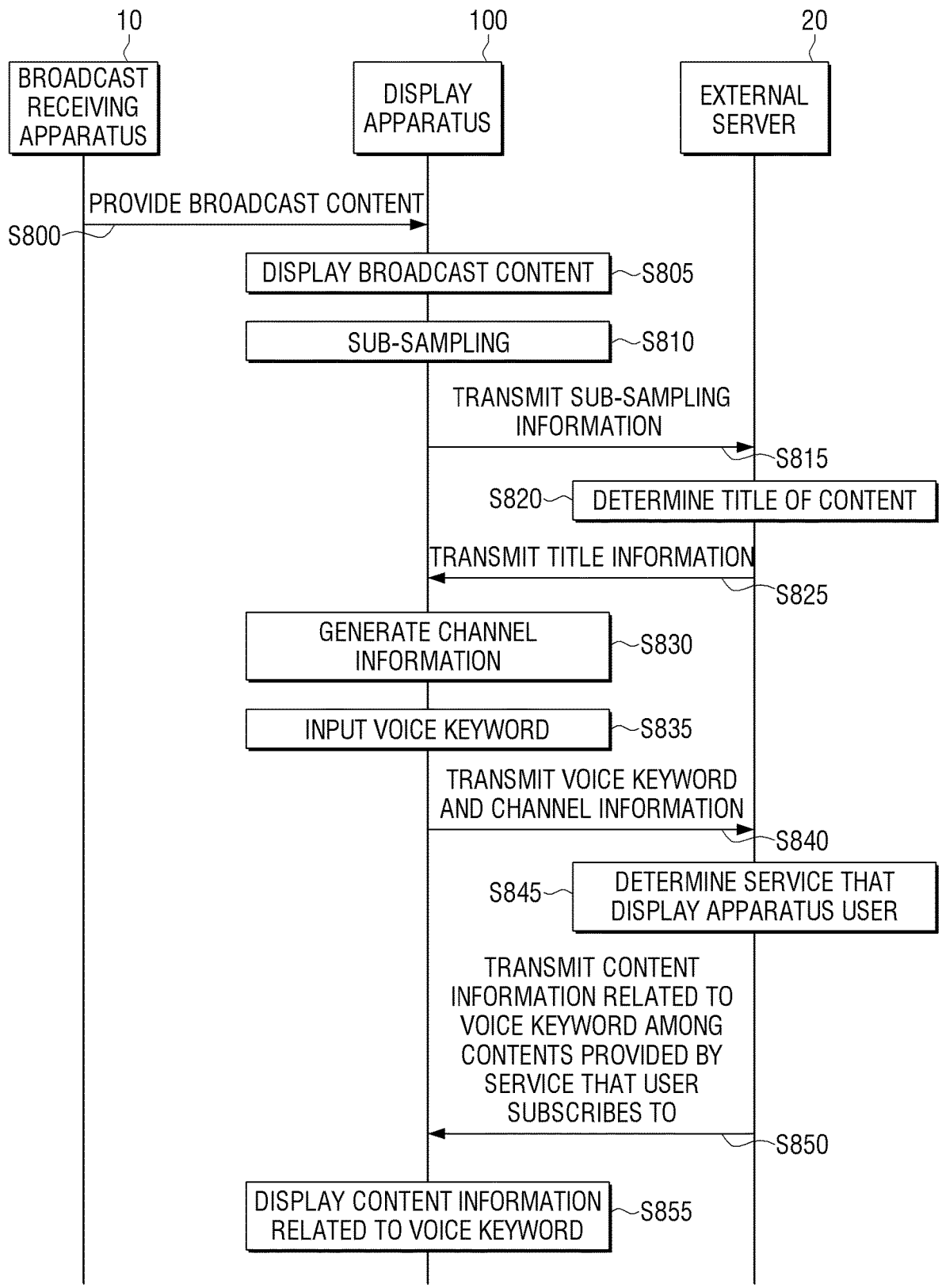

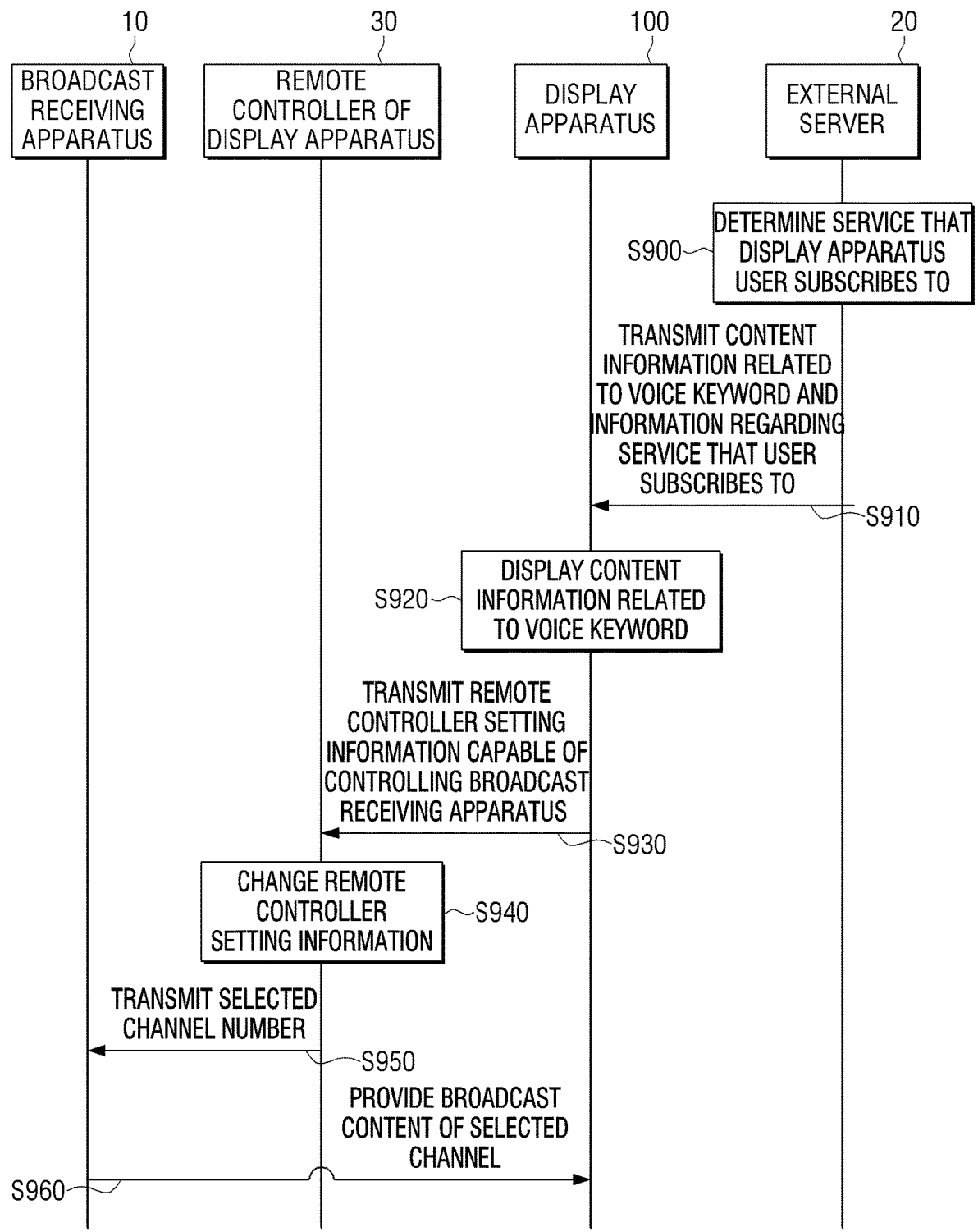

DISPLAY APPARATUS AND CONTROLLING METHOD THEREOF

CROSS-REFERENCE TO RELATED APPLICATION

This application is based on and claims priority under 35 U.S.C. § 119 to Korean Patent Application No. 10-2016-0007628, filed in the Korean Intellectual Property Office on Jan. 21, 2016, the disclosure of which is incorporated by reference herein in its entirety.

BACKGROUND

1. Field

The present disclosure relates generally to a display apparatus and a controlling method of the display apparatus, and for example, to a display apparatus which is connected to a broadcast receiving apparatus and a controlling method thereof 2. Description of Related Art Since various display apparatuses are developed and supplied thanks to the developments of electronic technology and according users' requests, various functions are gradually created. Accordingly, a user can watch various kinds of contents through various display apparatuses including a TV.

Specifically, a user can watch various broadcast contents of terrestrial broadcasts, cable broadcasts, a satellite broadcasts by connecting a display apparatus with various broadcast receiving apparatuses such as a set top box and a satellite receiving apparatus.

It is general for a user to subscribe one service among broadcast content providing services provided by various broadcast content service providers and watch broadcast contents on various channels provided by the service through a broadcast receiving apparatus.

In the circumstance that various broadcast contents are provided through various channels, a user search for a broadcast content that he/she wants and receive the broadcast content more quickly.

However, in the general using behavior of a user which is receiving a broadcast content by connecting a display apparatus with a broadcast receiving apparatus, a display apparatus simply receives a broadcast signal processed by the broadcast receiving apparatus and displays the signal, it is unknown what product the connected broadcast receiving apparatus is, what broadcast content providing service is provided through the connected broadcast receiving apparatus or what broadcast content is currently on air.

Therefore, when the user wishes to watch a desired channel, the user must typically memorize the channel of the broadcast receiving apparatus or search for the desired channel by changing channels.

SUMMARY

Apparatuses and methods disclosed herein relate generally to a display apparatus and a controlling method thereof.

An aspect of an example embodiment relates to a method of controlling a display apparatus, including: acquiring channel information regarding a broadcast content watched through a broadcast receiving apparatus that is connected to the display apparatus; in response to a voice keyword being input, transmitting information regarding the input voice keyword and the channel information to an external server; receiving, from the external server, content information related to the voice keyword among content information that is determined based on the channel information and provided by a broadcast content providing service that is subscribed to; and displaying the content information related to the received voice keyword.

The acquiring the channel information may include sub-sampling a displayed broadcast content and acquiring the channel information using sub-sampling information regarding the displayed broadcast content which is sub-sampled.

The acquiring the channel information using the sub-sampling information may include: transmitting the sub-sampling information to the external server; receiving title information regarding the displayed broadcast content from the external server; and generating the channel information based on the received title information.

The acquiring the channel information using the sub-sampling information may include: transmitting the sub-sampling information to the external server; and receiving the channel information from the external server.

The receiving may include receiving information regarding a broadcast content providing service is subscribed to, together with content information related to the voice keyword from the external server.

The information regarding the broadcast content providing service that is subscribed to may include at least one of information regarding a broadcast receiving apparatus provided by a broadcast content service provider that is subscribed to and information regarding a remote controller capable of controlling the broadcast receiving apparatus provided by the broadcast content service provider.

Changing a setting of a remote controller that controls the display apparatus based on the information regarding the broadcast content providing service that is subscribed to may be included.

The remote controller that controls the display apparatus may be an integrated remote controller, wherein the information regarding the remote controller may include setting information of the remote controller capable of controlling the broadcast receiving apparatus provided by the broadcast content service provider, wherein the changing the setting of the remote controller may include: displaying a remote controller setting change UI including information regarding the broadcast content providing service that is subscribed to; and transmitting the setting information of the remote controller capable of controlling a broadcast receiving apparatus selected on the UI to the remote controller that controls the display apparatus.

If the broadcast receiving apparatus equipped with a plurality of the broadcast receiving apparatuses respectively corresponding to a plurality of broadcast content providing services that are subscribed to, the receiving comprises receiving content information related to the voice keyword among content information provided by the plurality of broadcast content providing services, in response to a channel being selected among channels included in information related to the displayed voice keyword, selecting a broadcast receiving apparatus that provides a broadcast content of the selected channel among the plurality of broadcast receiving apparatuses through the remote controller of which the setting is changed; and transmitting information regarding the broadcast receiving apparatus that provides the broadcast content of the selected channel to the remote controller of which setting is changed.

According to an aspect of yet another example embodiment, a display apparatus is provided, including: broadcast signal input circuitry configured to receive a broadcast content from a broadcast receiving apparatus; a display configured to display the broadcast content; communication circuitry configured to communicate with an external server; voice input circuitry configured to receive a voice signal including a voice keyword; and a processor configured to acquire channel information regarding a broadcast content watched through the broadcast receiving apparatus and in response to the voice keyword being input through the voice input circuitry, to control the communication circuitry to transmit information regarding the input voice keyword and the channel information to the external server, in response to content information related to the voice keyword being received among content information that is determined based on the channel information and provided by a broadcast content providing service that is subscribed to from the external server through the communication circuitry, and to control the display to display the content information related to the received voice keyword.

The processor may sub-sample the displayed broadcast content and acquire the channel information using sub-sampling information regarding the displayed broadcast content which is sub-sampled.

The processor may control the communication circuitry to transmit the sub-sampling information to the external server and, in response to title information regarding the displayed broadcast content being received from the external server through the communication circuitry, generate the channel information based on the received title information.

The processor may control the communication circuitry to transmit the sub-sampling information to the external server and receive the channel information from the external server.

The processor may receive information regarding the broadcast content providing service is subscribed to, together with the content information related to the voice keyword from the external server through the communication circuitry.

The information regarding the broadcast content providing service that is subscribed to may include at least one of information regarding a broadcast receiving apparatus provided by a broadcast content service provider that is subscribed to and information regarding a remote controller capable of controlling the broadcast receiving apparatus.

Remote controller communication circuitry configured to communicate with a remote controller that controls the display apparatus may be further included and the processor may be configured to control the remote controller communication circuitry to transmit the information regarding the remote controller capable of controlling the broadcast receiving apparatus to the remote controller that controls the display apparatus.

The remote controller that controls the display apparatus may be an integrated remote controller, wherein the information regarding the remote controller includes setting information of the remote controller capable of controlling the broadcast receiving apparatus provided by the provider, wherein the processor displays a remote controller setting change UI including the information regarding the broadcast content providing service that is subscribed to and controls the remote controller communication circuitry to transmit setting information of a remote controller capable of controlling a broadcast receiving apparatus selected on the UI to the remote controller that controls the display apparatus.

The broadcast signal input circuitry may receive broadcast contents from a plurality of broadcast receiving apparatuses respectively corresponding to a plurality of broadcast content providing services that are subscribed to, wherein the processor receives content information related to the voice keyword among content information provided by the plurality of broadcast content providing services through the communication circuitry, in response to a channel being selected among channels included in information related to the displayed voice keyword through a remote controller that controls the display apparatus, the processor controls the broadcast signal input circuitry to select a broadcast receiving apparatus that provides a broadcast content of the selected channel among the plurality of broadcast receiving apparatuses, and controls the remote controller communication circuitry to transmit information regarding the broadcast receiving apparatus that provides the broadcast content of the selected channel to the remote controller that controls the display apparatus.

According to an aspect of yet another example embodiment, a broadcast content display system is provided, including: a broadcast receiving apparatus configured to receive a broadcast content and provide the broadcast content to a display apparatus; a display apparatus, in response to channel information regarding a broadcast content watched among broadcast contents provided from the broadcast receiving apparatus being acquired and a voice keyword being input, configured to transmit the information regarding the input voice keyword and the channel information to an external server, and in response to content information related to the voice keyword being received from the external server, to display the content information related to the received voice keyword; and an external server configured to determine a broadcast content providing service that is subscribed to based on the information regarding the voice keyword received from the display apparatus and the channel information and to provide content information related to the voice keyword among content information provided by the determined broadcast content providing service to the display apparatus.

A remote controller that controls the display apparatus may further included, wherein the external server further provides at least one of information regarding a broadcast receiving apparatus provided by a broadcast content service provider that is subscribed to and information regarding a remote controller capable of controlling the broadcast receiving apparatus provided by the broadcast content service provider to the display apparatus, and wherein the display apparatus changes a setting of the remote controller that controls the display apparatus using at least one of the information regarding the broadcast receiving apparatus and the information regarding the remote controller.

According to the various example embodiments, a user can search for and provided with a broadcast content that he/she wants more quickly. In addition, the user can control various broadcast receiving apparatuses through a remote controller of a display apparatus.

BRIEF DESCRIPTION OF THE DRAWINGS

These and other aspects, features and attendant advantages of the present disclosure will become more apparent from the following detailed description, taken in conjunction with the accompanying drawings, in which like reference numerals refer to like elements, and wherein:

FIGS. 8 and 9 are sequence diagrams illustrating example operations of a broadcast content display system according to various example embodiments.

DETAILED DESCRIPTION

In the following description, well-known functions or constructions may not described in detail if they would obscure the disclosure with unnecessary detail. Also, the term "unit" may be used for the ease of understanding the present disclosure.

Figure 1:
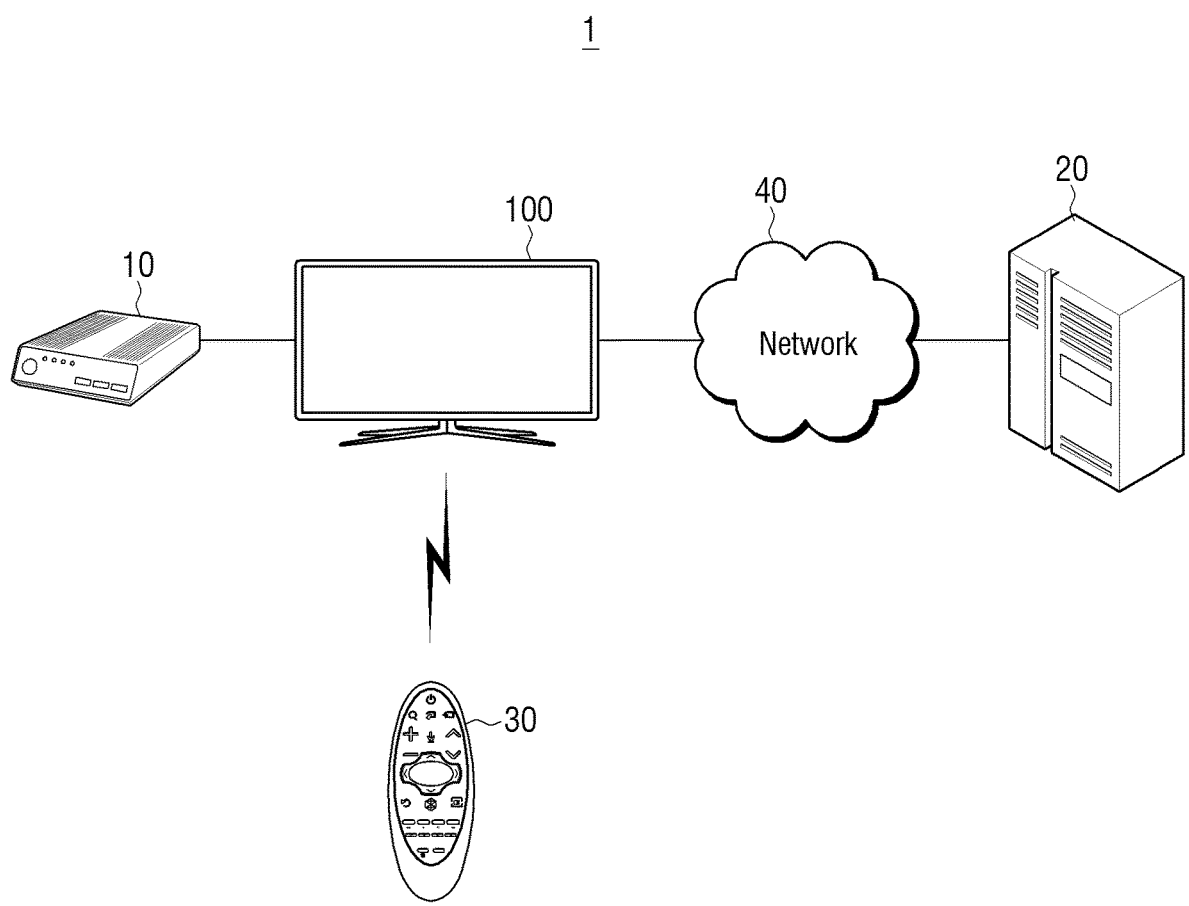
FIG. 1 is a diagram illustrating an example broadcast content display system according to an example embodiment.

Hereinafter, the present disclosure will be described in greater detail with reference to the accompanying drawings. FIG. 1 is a diagram illustrating an example broadcast content display system according to an example embodiment. FIG. 1 illustrates a broadcast content display system 1 including a broadcast receiving apparatus 10, a display apparatus 100, an external server 20 and a remote controller 30.

The broadcast receiving apparatus 10 is connected to the display apparatus 100 with wires and/or wirelessly, receives broadcast content provided by a broadcast content service provider and provides the broadcast content to the display apparatus 100.

A user may subscribe to a service provided by the broadcast content service provider and receive a broadcast content through the broadcast receiving apparatus 10. Herein, the broadcast content service provider may refer, for example, to a provider that provides a broadcast content to a service subscriber through a cable, a satellite or on the Internet, or the like, but is not limited thereto. For example, the provider may be a system operator, a satellite broadcasting service operator or an internet broadcaster, or the like.

The broadcast receiving apparatus 10 may refer, for example, to an apparatus that receives various types of broadcast signals from, for example, and without limitation, Ethernet cables, a satellite dish, terrestrial broadcast receiving antennas, a coaxial cable, a telephone wire, an analogue VHF antenna and a UHF antenna, or the like, and provide the signals to the display apparatus 100. The broadcast receiving apparatus 10 may be referred to, for example, as a set top box but it is not limited the name and, for example, it can be a cable broadcast receiver, an internet protocol television (IPTV) receiver, a satellite broadcast receiver, etc.

The display apparatus 100 receives a broadcast content provided by the broadcast receiving apparatus 10 and displays the broadcast content. When a voice keyword of a user is input, the display apparatus 100 may display information regarding a broadcast content related to the input voice keyword.

For example, the display apparatus 100 may acquire channel information regarding broadcast content that the user watched among broadcast contents provided by the broadcast receiving apparatus 10. Herein, the channel information regarding the broadcast content that the user watched indicates information regarding a title of a broadcast content displayed on the display apparatus 100 in a certain time, and will be described in greater detail below.

If, for example, the user utters a voice keyword to search for desired broadcast content, the display apparatus 100 may recognize the uttered voice keyword and transmit information regarding the recognized voice keyword and the acquired channel information to the external server 20.

The external server 20 may determine a broadcast content providing service that the user subscribed to among various broadcast content providing services based on information regarding the received voice keyword and the channel information, extract content information related to the voice keyword among broadcast contents provided by the service and transmit the content information to the display apparatus 100. The content information related to the voice keyword may include, for example, and without limitation, titles of broadcast contents related to the voice keyword, broadcasters that provide the respective broadcast contents, channel numbers, service names, airtime of each broadcast content, etc. It will be understood that the content information is not limited thereto.

Since the display apparatus 100 displays content information related to a voice keyword received from the external server 20, a user may search for a broadcast content that he/she wants and be provided with the broadcast content more quickly.

The display apparatus 100 may be connected to the external server 20 through a wired or wireless network 40 such as, for example, and without limitation, the Internet and transceive various information. The display apparatus 100 may be realized as a TV, a monitor, an electronic bulletin board, an electronic frame, an electronic table, a large format display (LFD), etc. However, the display apparatus 100 is not limited thereto and the display apparatus 100 may, by being connected to the broadcast receiving apparatus, be realized as various electronic apparatuses which have a display function displaying a broadcast content received from the broadcast receiving apparatus 10, a voice recognition function which can recognize a user's voice and a communication function providing communication with the external server 20.

Since a user is provided with the content information that he/she wants among broadcast contents provided by a service that the user subscribes to, the user may check channel information related to a voice keyword displayed on the display apparatus 100, and watch a broadcast content on the desired channel or reserve the channel to watch by selecting the channel.

According to an example embodiment, a user may select the desired channel with a remote controller that controls the broadcast receiving apparatus 10.

According to another example embodiment, the user may select a desired channel using the remote controller 30 that controls the display apparatus 100. For example, the external server 20 may transmit information regarding a broadcast content providing service together with content information regarding the voice keyword to the display apparatus 100.

The information regarding the broadcast content providing service may include information regarding a model name or a manufacturer of a broadcast receiving apparatus provided by a broadcast content service provider that a user subscribes to and information regarding a remote controller such as a controlling code of the remote controller that can control the broadcast receiving apparatus.

The display apparatus 100 may change a remote controller setting of the remote controller 30 that controls the display apparatus 100 using information regarding the broadcast content providing service received from the external server 20. The remote controller 30 of the display apparatus 100 may be an integrated remote controller but it is not limited thereto and it may be a smartphone in which a remote controller application is executed, or the like.

For example, the display apparatus 100 may control the broadcast receiving apparatus 10 through the remote controller 30 of the display apparatus 100 by displaying a remote controller setting change UI including information regarding a broadcast content providing service that a user subscribes to, transmitting a remote controller controlling code that can control the broadcast receiving apparatus 10 selected on the UI to the remote controller 30 and the remote controller 30 setting the received controlling code.

The user may check channel information related to the voice keyword displayed on the display apparatus 100 and select a desired channel to watch immediately or reserve the channel to watch later using the remote controller 30 of the display apparatus 100.

FIG. 1, illustrates that all functions are operated by one external server 20 communicating with the display apparatus 100 but the example embodiment is not limited thereto. For example, the broadcast content providing system 1 may operate through a plurality of external servers such as a first external server providing channel information to the display apparatus 100 and a second external server providing content information related to the voice keyword or information regarding the broadcast content providing service that the user subscribes to.

In addition, the example embodiment is not limited to the example in which the display apparatus 100 is connected with one broadcast receiving apparatus 10. The present disclosure may be applied even in case of the display apparatus 100 being connected with a plurality of broadcast receiving apparatuses.

Display apparatuses according to the below various example embodiments also may operate in the circumstance of the broadcast content display system 1 according to an example embodiment like the display apparatus 100.

Figure 2:
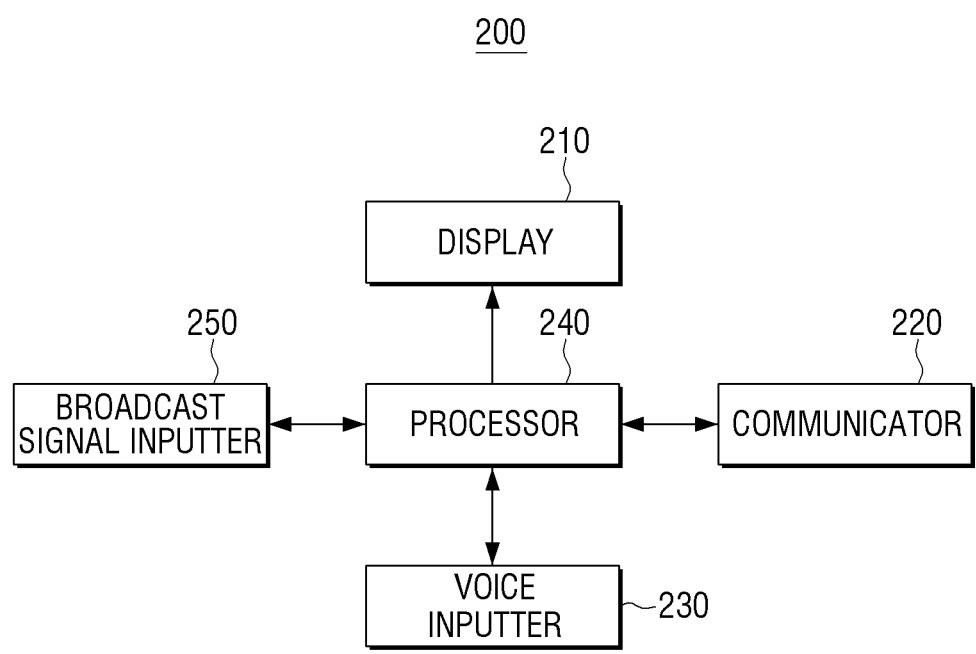
FIG. 2 is a block diagram illustrating an example configuration of a display apparatus according to an example embodiment.

FIG. 2 is a block diagram illustrating an example configuration of a display apparatus according to an example embodiment. FIG. 2 illustrates a display apparatus 200 including a display 210, a communicator (e.g., including communication circuitry) 220, a voice inputter (e.g., including voice input circuitry) 230, a processor 240 and a broadcast signal inputter (e.g., including broadcast signal input circuitry) 250.

The broadcast signal inputter 250 includes various input circuitry that receives a broadcast signal including a broadcast content from the broadcast receiving apparatus 10. The broadcast receiving apparatus 10 may be connected with the display apparatus 200 using the broadcast signal inputter 250, receive a broadcast content provided through a service that a user subscribes to and provide the broadcast content to the display apparatus 200 through the broadcast signal inputter 250.

The broadcast signal inputter 250 may include various input circuitry, such as, for example, and without limitation, analogue interfaces such as a composite socket, S-Video, a component, D-Subminiature (D-Sub), etc. and various digital interfaces such a digital visual interface (DVI), Sony/Philips Digital Interconnect Format (S/PDIF), a high definition multimedia interface (HDMI), etc.

The display 210 may display a broadcast content provided by the broadcast receiving apparatus 10 through the broadcast signal inputter 250. For example, when a broadcast signal of a channel tuned by a user is processed in the broadcast receiving apparatus 10 and input through the broadcast signal inputter 250, the display 210 may display an image including the input broadcast signal.

The display 210 may display various UIs that can manipulate the display apparatus 200. A UI may include an image and/or text and may be displayed in a form of an on screen display (OSD). For example, according to an example embodiment, the display 210 may, under the control of the processor 240, display content information related to a user's voice keyword received from the external server 20 or information regarding a broadcast content providing service that the user subscribes to. The display 210 may display a remote controller setting change UI including information regarding the broadcast content providing service that the user subscribed.

The display 210 may be realized using various display technologies. For example, the display 210 may be realized as organic light emitting diodes (OLED) display, a liquid crystal display panel (LCD), a plasma display panel (PDP), a vacuum fluorescent display (VFD), a field emission display (FED), an electro luminescence display (ELD), or the like, but is not limited thereto.

The communicator 220 includes various communication circuitry configured to communicate with the external server 20. For example, the communication circuitry of the communicator 220 may be connected to the external server 20 through various wired/wireless networks and transceive various information with the external server 20 under control of the processor 240.

A network that the communicator 220 can use is not limited to a certain means. For example, mobile communication networks such as CDMA, GSM, HSPA+, LTE and the like, local area networks such as Wi-Fi, Bluetooth, Wibro, Wimax, ZigBee and the like and cable communication networks such as Ethernet, xDSL (for example, ADSL and VDSL), hybrid fiber coaxial cable (HFC) and the like may be included.

A composition of the communicator 220 may include various communication circuitry, including, without limitation, hardware and software that can use the various networks. A detailed description of the various communication circuitry is omitted since such circuitry is generally known to those skilled in the art.

The voice inputter 230 includes various input circuitry configured to receive a voice signal based on an utterance of a user. For example, the input circuitry of the voice inputter 230 may receive the voice signal according to the voice keyword that the user uttered to search for a broadcast content and provide the voice signal to the processor 240.

The voice inputter 230 may include various input circuitry, such as, for example, and without limitation, a microphone. The input circuitry of the voice inputter 230 may be wirelessly connected to a microphone which is outside of the display apparatus 200 and receive a voice signal of a user which is input through the external microphone.

For example, the voice inputter 230 may include input circuitry, such as, for example, and without limitation, a microphone equipped with a smartphone in which an external remote controller or a remote controller application is executed in addition to a microphone equipped with the display apparatus 200.

The processor 240 controls overall operation of the display apparatus 200. For example, the processor 240 may acquire channel information regarding a broadcast content that the user watched through the broadcast receiving apparatus 10.

The channel information regarding the broadcast content that the user watched through the broadcast receiving apparatus 10 may refer, for example, to information regarding history of broadcast contents displayed on the display 210, the broadcast contents being on channels which were tuned by the user and, the channel information may include, for example, information regarding a title of a broadcast content which is displayed at a certain time.

The broadcast content displayed on the display 210 may include a broadcast program or an advertisement displayed for a short time through a channel zapping in addition to a broadcast content that the user actually watched for a certain period of time.

Such channel information that the user watched may be transmitted to the external server 20 and may be used to determine a broadcast content providing service that the user subscribes to.

For example, the processor 240 may sub-sample a broadcast content displayed on the display 210 and acquire channel information using the sub-sampled information. For example, the processor 240 may sub-sample a broadcast content by selecting an image frame in a pre-set time interval in consecutive image frames of the displayed broadcast contents.

In addition, the processor 240 may sub-sample a broadcast content by selecting (for example, by downscaling) at least a part of the respective consecutive image frames of the displayed broadcast contents.

The processor 240 may sub-sample the consecutive image frames of the displayed broadcast contents periodically or spatially.

According to an example embodiment, the processor 240 also may combine a periodically sub-sampling and a spatially sub-sampling by sub-sampling at least a part regarding image frames that were sub-sampled in pre-set time intervals. In this example, the processor 240 may also acquire channel information by using the combined sub-sampling information.

According to an example embodiment, the processor 240 may not only acquire channel information by sub-sampling an image frame of the broadcast content which is displayed on the display 210 but may also use an audio frame in acquiring channel information by sub-sampling.

According to an example embodiment, processor 240 may control the communication circuitry of the communicator 220 to transmit the sub-sampled information to the external server 20 and when title information regarding a broadcast content is received from the external server 20, generate channel information based on the received title information. The processor 240 may store the sub-sampled information and transmit the sub-sampled information to the external server 20 in a pre-set interval or transmit the sub-sampled information to the external server 20 whenever the processor 240 sub-samples.

A finger printing technology among auto contents recognition (ACR) technologies may be applied. For example, the external server 20 may build database regarding all broadcast contents and accordingly, when sub-sampling information is received from the display apparatus 200, what broadcast content the sub-sampling information pertains to can be identified by comparing the received sub-sampling information with the built database. Accordingly, the external server 20 may transmit title information regarding a broadcast content according to the sub-sampling information received from the display apparatus 200, to the display apparatus 200.

The method of the display apparatus 200 acquiring title information regarding a displayed broadcast content is not limited thereto. For example, in case of a broadcast content to which a water marking technology which is adding a water marking by which a content can be distinguished on the content itself among the ACR technology is applied, the processor 240 may execute an application which can distinguish the content and acquire title information regarding the broadcast content directly from the displayed broadcast content.

When title information of a broadcast content is acquired, the processor 240 may generate channel information based on the acquired title information. For example, the processor 240 may generate channel information by matching the time that a displayed random broadcast content is sub-sampled and title information corresponding to sub-sampling information of the time.

For example, if broadcast contents displayed from 9 A.M. to 9 P.M. on a certain date are sub-sampled every ten minutes, the processor 240 may generate channel information by matching title information regarding the broadcast contents displayed on the display 210 in every ten minutes from 9 A.M. to 9 P.M. on the certain date.

According to another example embodiment, the channel information may be generated in the external server 20 and be provided to the display apparatus 200. For example, in case that the processor 240 controls the communication circuitry of the communicator 220 to transmit sub-sampling information to the external server 20 in a real time or store and periodically transmit the sub-sampling information, if the communicator 220 is controlled to transmit information regarding the sub-sampled time together with the sub-sampling information to the external server 20, since the external server 20 identifies the time that the received sub-sampling information was sub-sampled, channel information may be generated by matching the time that the received sub-sampling information was sub-sampled and title information based on the sub-sampling information, and the generated channel information may be transmitted to the display apparatus 200.

In this example, information that can specify the display apparatus 200 may be provided to the external server 20. For example, according to the various example embodiments, a name of the display apparatus 200 that a user who subscribes to a service that the external server 20 can provide, a MAC address or an IP address of the display apparatus 200, etc. may be provided.

When a voice keyword is input by a user through the input circuitry of the voice inputter 230, the processor 240 may control the communicator 220 to transmit information regarding the input voice keyword and channel information acquired through the above described method to the external server 20.

For example, when a user utters a voice keyword to search for a broadcast content and a voice signal according to the user's voice keyword is input to the voice inputter 230, the processor 240 may recognize the user's voice keyword and transmit information regarding the recognized voice keyword and channel information to the external server 20. In order to receive a voice signal according to the utterance of the user and recognize the voice keyword, the processor 240 may use various voice recognizing technology.

The external server 20 may determine information regarding a broadcast content providing service that a user subscribes to based on the information regarding the voice keyword received from the display apparatus 100 and the channel information and transmit content information regarding the received voice keyword among the content information provided by the determined service to the display apparatus 200.

For example, the external server 20 may acquire information regarding services that each broadcast content service provider provides. The information regarding the services that each of the broadcast content service provider provides may include, for example, and without limitation, 1) information on a name or service area of a broadcast content service provider, etc., 2) information regarding services such as a service name that a user subscribes to, channels provided for each fee payment plan, etc., 3) information regarding broadcast contents such as titles, members of the cast, a timetable of each broadcast content provided through a service, 4) information regarding a broadcast receiving apparatus that a broadcast content service provider provides to a service subscriber and 5) information regarding a remote controller capable of controlling a broadcast receiving apparatus.

Since the external server 20 is connected to a server that each broadcast content service provider runs through a wired or wireless network, the external server 20 may acquire information regarding a service provided by each broadcast content service provider in real time or acquire information regarding a service in advance from each broadcast content service provider and store the information. However, it is not limited thereto, and the information may be acquired through a server that provides information regarding a separate broadcast content providing service run by a third party rather than a broadcast content service provider.

The external server 20 may specify a broadcast content providing service that a user of the display apparatus 200 subscribes to by comparing the channel information received from the display apparatus 200 with information regarding services provided by the broadcast content service providers.

For example, since the channel information received from the display apparatus 200 includes title information of a broadcast content displayed on the display 210 at a certain time, the external server 20 may compare broadcast timetables provided by broadcast contents service providers with the received channel information and specify a broadcast content providing service that provided the certain broadcast content at the certain time.

For example, if received channel information includes information that the broadcast content titled A was displayed at the exact time of 10 A.M. on a certain date, the external server 20 may specify a service that provided the content with title A at the exact time of 10 A.M. on the date on a broadcast timetable.

Only with a piece of information such as a title at a certain time, a service that a user subscribes to may not be exactly specified. However, according to an example embodiment, since the processor 240 can sub-sample a displayed broadcast content and control the communicator 220 to transmit the sub-sampling information to the external server 20, as an amount of channel information that the processor 240 acquires and transmits to the external server 20 increases, the external server 20 may specify a service that a user subscribes to more exactly and/or precisely.

When a broadcast content providing service that a user subscribes to is determined, the external server 20 may specify 1) information regarding a broadcast content service provider (a name of the provider, service areas, etc.), 2) information regarding a service (a name of the service, fee payment plans, etc.), 3) information regarding a broadcast content (a broadcast content timetable, etc.), 4) information regarding a broadcast receiving apparatus that a broadcast content service provider that the user subscribes provides to subscribers (a name of a manufacturer, a name of a model, etc.) and 5) information regarding a remote controller according to each broadcast receiving apparatus (a name of a manufacturer, a name of a model, a controlling code, etc.). The information may be specified in such way, and the information regarding the broadcast content providing service that the user subscribes to, may be provided to the display apparatus 200 as descriptions which will be described in greater detail below.

The external server 20 may extract content information related to a voice keyword among content information provided through the determined broadcast content providing service that the user subscribes to and provide the content information to the display apparatus 200.

For example, since the external server 20 has information regarding a broadcast content such as a title, members of the cast, a broadcast timetable of the broadcast content provided by the service that the user subscribes to, the external server 20 may extract broadcast content information that matches the voice keyword received from the display apparatus 200 and may transmit the content information related to the extracted voice keyword to the display apparatus 200.

The content information related to the voice keyword may include, for example, titles, channel numbers, names of broadcasters, airtimes of broadcast contents related to the voice keyword. However, it is not limited thereto.

When the content information related to the voice keyword is received through the communicator 220, the processor 240 may control the display 210 to display the content information related to the received voice keyword. The processor 240 may control the display 210 to display the content information related to the voice keyword such as, for example, titles, channel numbers, names of broadcasters and airtimes of broadcast contents but it is not limited thereto.

According to an example embodiment, the external server 20 also may generate the content information related to the voice keyword in a form of broadcast timetable and transmit the broadcast timetable, and processor 240 may control the display 210 to display the broadcast timetable on the broadcast content related to the received voice keyword as it is.

According to an example embodiment, the external server 20 may transmit information regarding a broadcast content providing service that a user subscribes to, together with the content information related to the voice keyword to the display apparatus 200. When the information regarding the broadcast content providing service that the user subscribes to is received through the communicator 220, the processor 240 may control the display 210 to display the information.

The processor 240 may control the display 210 to display the information regarding the broadcast content providing service that the user subscribes to, which is at least one of, for example, a service name, a service area, a service provider name, a fee payment plan, a broadcast timetable of the broadcast content providing service that the user subscribes to, with or without the content information related to the voice keyword.

In addition, the processor 240 may control the display 210 to display information regarding a broadcast receiving apparatus that the broadcast content service provider that the user subscribes provides to a subscriber such as a model name, an image, a manufacturer and the like or information regarding a remote controller capable of controlling each broadcast receiving apparatus such as a controlling code, a model name and an image.

Hereinafter, various example embodiments will be described in greater detail below with reference to FIGS. 3 to 7.

Figure 3:
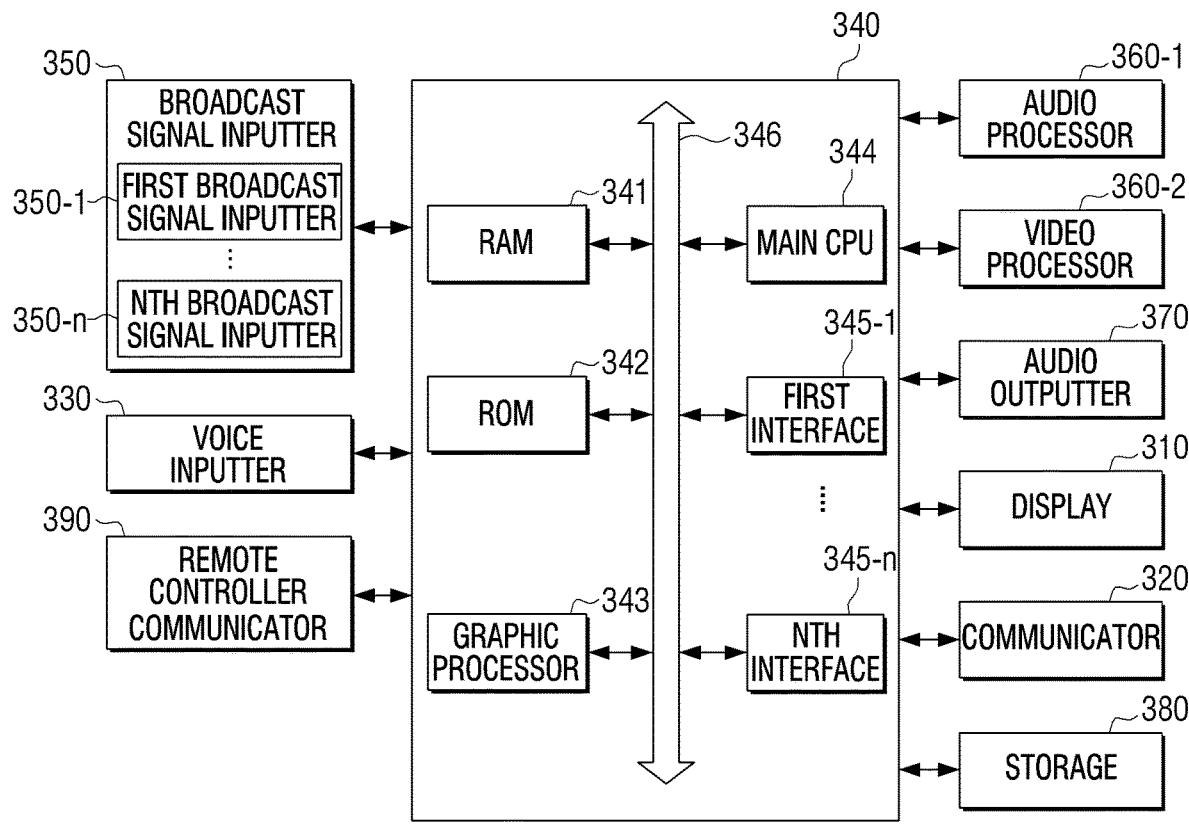
FIG. 3 is a block diagram illustrating an example configuration of a display apparatus according to an example embodiment.

FIG. 3 is a block diagram illustrating an example configuration of a display apparatus according to another example embodiment. FIG. 3 illustrates a display apparatus 300 including a display 310, a communicator (e.g., including communication circuitry) 320, a voice inputter (e.g., including input circuitry) 330, a processor 340, a broadcast signal inputter (e.g., including broadcast signal input circuitry) 350, an audio processor 360-1, a video processor 360-2, an audio outputter (e.g., including audio output circuitry) 370, a storage 380 and a remote controller communicator (e.g., including communication circuitry) 390. An element among the elements illustrated in FIG. 3 may also be deleted or changed and another element may be added. In describing FIG. 3, explanations repetitive to the explanations of the display apparatus 200 illustrated in FIG. 2 may be omitted.

The broadcast signal inputter 350 may include various broadcast signal input circuitry configured to perform an identical or similar function function to the broadcast signal inputter 250 illustrated in FIG. 2. However, the broadcast signal inputter 350 may include a first broadcast signal inputter 350-1 to an nth broadcast signal inputter 350-n. Therefore, the broadcast signal inputter 350 may be connected with a plurality of broadcast receiving apparatuses and receive a broadcast content provided through each of the broadcast receiving apparatuses.

The communicator 320 may include various communication circuitry configured to perform an identical or similar function to the communicator 220 illustrated in FIG. 2. In addition, the communicator 320 may communicate with other external apparatuses. For example, through the communicator 320, the display apparatus 300 may be connected to an external microphone or an external speaker with wires or wirelessly and communicate with different external display apparatuses or various servers.

For this, the communicator 320 may include various communication circuitry, such as, for example, and without limitation, at least one communication module comprising communication circuitry of a near field communication (NFC) module (not illustrated) and a wireless LAN communication module (not illustrated). The NFC module (not illustrated) may, for example, be a communication module including communication circuitry that wirelessly performs data communications with an external apparatus nearly located. For example, the NFC module may be, for example, a Bluetooth module, a ZigBee module, etc. In addition, the wireless LAN communication module (not illustrated) is a module which performs communications by being connected to an external network according to a wireless communication protocol such as WiFi, IEEE, etc. The communicator 320 may further include a mobile communication module including communication circuitry which communicates by accessing a mobile network according to various communication standards such as 3rd Generation (3G), 3rd Generation Partnership Project (3GPP), Long Term Evolution (LTE), etc. In addition, the communicator 320 may include communication circuitry, such as, for example, and without limitation, at least one of wired communication modules (not illustrated) such as a High-Definition Multimedia Interface (HDMI), a Universal Serial Bus (USB), an Institute of Electrical and Electronics Engineers (IEEE) 1394, RS-232, etc.

The audio processor 360-1 may include various audio processing circuitry that performs various processes regarding audio signals among broadcast signals which are processed in a broadcast receiving apparatus and inputted through the broadcast signal inputter 350. For example, the audio processor 360-1 may perform various processes such as amplifying and filtering noise for audio data included in an audio signal, and to that end may include circuitry including, for example, and amplifier, filter, or the like. The processed audio data may be output through the audio outputter 370.

The video processor 360-2 may include various circuitry that performs various processes regarding video signals among broadcast signals which are processed in the broadcast receiving apparatus and inputted through the broadcast signal inputter 350. For example, the video processor 360-2 may include various circuitry to perform various image processes such as scaling, noise filtering, a frame rate conversion, changing image resolution of image data included in a video signal. The processed image data may be displayed on the display 210.

The audio outputter 370 may include various output circuitry that outputs audio data which was processed in the audio processor 360-1. For example, the audio outputter 370 may include at least one speaker. However, it is not limited thereto. According to an example embodiment, the audio outputter 370 may include an external speaker which is connected with wires or wirelessly.

The storage 380 may store an operating system (O/S) to drive the display apparatus 300. According to the various example embodiments of the present disclosure, the storage 380 may store various software programs or applications for operating the display apparatus 300 and various information such as various data which is inputted, set or generated while a program or an application is executed.

In addition, the storage 380 may include various software modules to operate the display apparatus 300 according to the various example embodiments of the disclosure and the processor 340 may perform an operation of the display apparatus 300 according to the various example embodiments by executing various software modules stored in the storage 380.

The storage 380 may include, without limitation, one or more of a semiconductor memory such as a flash memory or a magnetic storage medium such as a hard disk. According to an example embodiment, a virtual data storage on a network may also be included in a category of the storage 380.

The remote controller communicator 390 may include various communication circuitry that communicates with the external remote controller 30. For example, the remote controller communicator 380 may receive a controlling signal to control the display apparatus 300 from the remote controller 30 based on a manipulation of a user and transmit information regarding a remote controller capable of controlling the broadcast receiving apparatus 10 to the remote controller 30.

The remote controller 30 may be an integrated remote controller to control the display apparatus 300 but it is not limited thereto and the remote controller 30 may be an external apparatus including, for example, a smartphone in which a remote controller application is executed.

The remote controller communicator 390 may include various communication circuitry according to a communication method with the remote controller 30. For example, in case of a communication with the remote controller 30 in a way of using infrared rays, the remote controller communicator 390 may include circuitry, such as an IR receiver (not illustrated) capable of receiving infrared rays. However, it is not limited thereto. When the display apparatus 300 communicates with the remote controller 30 through a Bluetooth, ZigBee, RFID or WiFi, various hardware modules, circuitry and/or software modules that can communicate with the remote controller 30 in one of the communication methods may be included.

The processor 340 may control overall operation of the display apparatus 300. For example, the processor 340 may control the overall operation of the display apparatus 300 using the various modules stored in the storage 390. The processor 340 may include, as illustrated in FIG. 3, a RAM 341, a ROM 342, a graphic processor (e.g., a GPU) 343, a main CPU 344, first to nth interfaces 345-1 to 345-n, and a bus 346. In this case, the RAM 341, the ROM 342, the graphic processor 343, the main CPU 344, the first to the nth interface 345-1~345-n, etc. may be interconnected through the bus 346.

The ROM 341 stores a set of commands for booting a system. When a turn-on command for the display apparatus 300 is input and power is supplied, the main CPU 344 copies an O/S stored in the storage 390 according to a command stored in the ROM 342, to the RAM 341, and boots a system by executing the O/S. When the boot is completed, the main CPU 344 may copy various programs stored in the storage 390 to the RAM 341 and perform various operations by executing the copied programs.

The graphic processor 343 displays an image when the booting the display apparatus 300 is completed. For example, the graphic processor 343 may generate a display including various objects such as an icon, an image, a text, etc. by using a calculator (not illustrated) and a renderer (not illustrated). The calculator (not illustrated) calculates attribute values such as coordinates, a form, a size, colors and the like of each object to be displayed according to a layout of a display. The renderer (not illustrated) generates displays of various layouts including an object based on the attribute values calculated in the calculator (not illustrated). The display generated in the renderer (not illustrated) is provided to the display 310 and displayed on a display area.

The first to nth interfaces 345-1 to 345-n may be connected to various elements 310 to 330 and 350 to 390 of the display apparatus 300. One of the interfaces may be a network interface which is connected to an external apparatus through a network.

For example, the processor 340 may, as described with reference to FIG. 2, acquire channel information regarding a broadcast content that a user watched through the broadcast receiving apparatus 10.

When a voice keyword of a user is input through the voice inputter 330, the communication circuitry of the communicator 320 may be controlled to transmit information regarding the input voice keyword and channel information to the external server 20. When content information regarding the voice keyword among content information determined based on the channel information and provided by a broadcast content providing service that a user subscribes to, from the external server through the communicator 320, the display 310 may be controlled to display the received content information related to the voice keyword.

Figure 4:
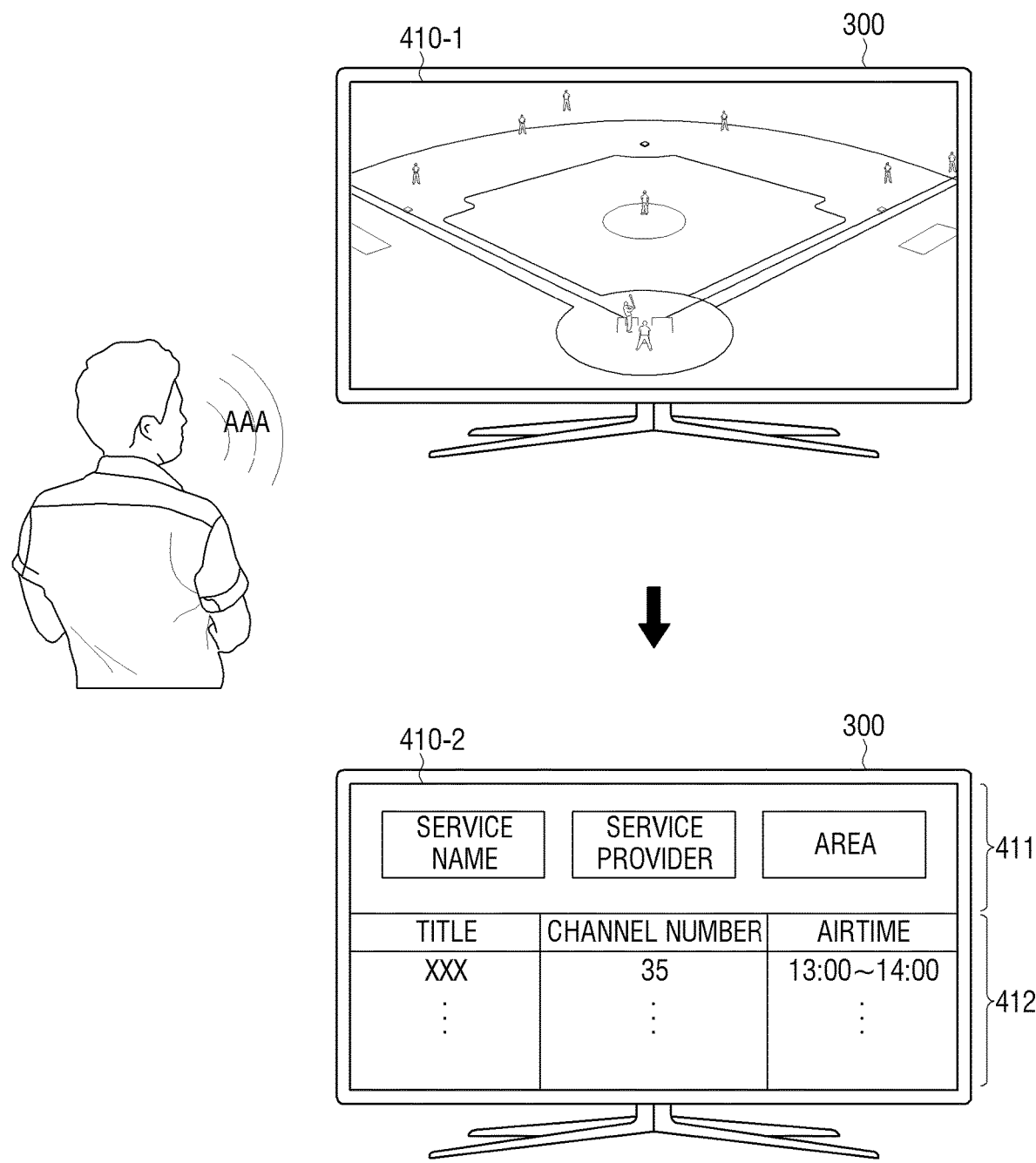
FIG. 4 is a diagram illustrating example content information related to a voice keyword being displayed on a display apparatus according to an example embodiment.

FIG. 4 is a diagram illustrating example content information related to a voice keyword being displayed on a display apparatus according to an example embodiment. For example, FIG. 4 illustrates an operation of a display apparatus after channel information is acquired from the external server 20. As illustrated in FIG. 4, while a baseball game is being displayed on a screen 410-1 of a display apparatus 300, a user may utter keyword "AAA" which is related to a broadcast content that the user wants to watch.

Keyword "AAA" that the user uttered may be a keyword related to the baseball game which is being displayed on the screen 410-1 but it is not limited thereto, and may be a random voice keyword which is related to a broadcast content that the user wants to search for but irrelevant to the displayed content.

The processor 340 may control the communicator 320 to transmit voice keyword "AAA" and the previously acquired channel information to the external server 20.

The external server 20 may determine a broadcast content providing service that the user subscribes to using the channel information received from the display apparatus 300, extract content information related to the voice keyword "AAA" among broadcast contents provided by the service and transmit the content information to the display apparatus 300. The external server may transmit the information regarding the broadcast content providing service with the content information related to the voice keyword.

When the content information related to the voice keyword "AAA" is received through the communicator 320, the processor 340 may control the display 310 to display the received content information. The processor 340 may control the display 310 to display the content information related to the voice keyword in an OSD form but it is not limited thereto.

The diagram in a lower part of FIG. 4 illustrates an example of content information related to the voice keyword "AAA" being displayed on a display screen 410-2. As illustrated in the lower part drawing in FIG. 4, the processor 340 may display titles of broadcast contents related to "AAA," channel numbers providing the broadcast contents and broadcast timetables 412 including airtimes in an OSD form, but it is not limited thereto. For example, the processor 340 may display a content (not illustrated) which is currently on-air among the broadcast contents related to the voice keyword on at least one area of the display screen 410-2.

The processor 340 may control the display 310 to display at least one piece of information regarding the broadcast content providing service that is received from the external server 20 and the user subscribes to, together with the content information related to the voice keyword. FIG. 4 illustrates that information 411, for example, regarding a service name, a service provider name and a service area of a broadcast content providing service that a user subscribes to is displayed with content information 412 related to a voice keyword but it is not limited thereto.

The user may check the content information related to the displayed voice keyword, select a wanted channel through a remote controller of the broadcast receiving apparatus 10, and watch a broadcast content related to the voice keyword or reserve the broadcast content to watch.

According to an example embodiment, the user may watch a wanted broadcast content by manipulating the broadcast receiving apparatus 10 using the remote controller of the display apparatus 100.

For example, information regarding the broadcast content providing service that the user subscribes to, as described the above, may include information regarding a broadcast receiving apparatus provided by a broadcast content service provider that the user subscribes to or information regarding a remote controller capable of controlling the broadcast receiving apparatus provided by the provider. The information regarding the broadcast receiving apparatus may include information such as a model name or a manufacturer of the broadcast receiving apparatus and in the information regarding the remote controller, remote controller setting information such as a remote controller controlling code capable of controlling a certain broadcast receiving apparatus may be included.

The processor 340 may use the received information regarding the broadcast content providing service in changing a setting of the remote controller 30 of the display apparatus 300.

For example, the broadcast content service provider that the user subscribes may provide only one kind of broadcast receiving apparatus to subscribers, when a service that the user subscribes to is specified, the broadcast receiving apparatus 10 of the user may be specified.

In this example, through the communication circuitry of the communicator 320, the processor 340 may acquire the information regarding the remote controller capable of controlling the broadcast receiving apparatus 10 using manufacturer information and model name information of the broadcast receiving apparatus 10, received through the external server 20. For example, the processor 340 may access a server operated by a manufacturer of the broadcast receiving apparatus 10 or a server operated by a manufacturer of the remote controller capable of controlling the broadcast receiving apparatus 10, and may acquire remote controller setting information by which the broadcast receiving apparatus 10 may be controlled.

The processor 340 may control the communication circuitry of the remote controller communicator 390 to transmit the acquired remote controller setting information to the remote controller 30 of the display apparatus 300, and the remote controller 30 may receive and set the remote controller setting information to control the broadcast receiving apparatus 10.

In addition, according to an example embodiment, in case the external server 20 acquires the remote controller setting information that can control the broadcast receiving apparatus 10 and transmit the remote controller setting information to the display apparatus 300, the processor 340 may change a setting of the remote controller 30 by transmitting the remote controller setting information received from the external server 20 to the remote controller 30 of the display apparatus 300.

In the example in which the broadcast content service provider that the user subscribes to provides various kinds of broadcast receiving apparatuses to subscribers, the processor 340 may control the display 210 to display a UI screen by which the user may select a broadcast receiving apparatus that he/she is using by using information regarding broadcast receiving apparatuses received from the external server 20. Accordingly, among the displayed plurality of broadcast receiving apparatuses, a broadcast receiving apparatus that the user selected may be specified as the broadcast receiving apparatus 10.

When the broadcast receiving apparatus 10 is specified, the processor 340 may, as described the above, change a setting of the remote controller 30 by acquiring the remote controller setting information that can control the broadcast receiving apparatus 10 through the communicator 320 or transmitting the remote controller setting information received from the external server 20 to the remote controller 30 of the display apparatus 300.

From the above, the changing the setting of the remote controller 30 of the display apparatus 300 may include additionally setting remote controller setting information that can control the broadcast receiving apparatus 10 in an external apparatus such as a smartphone including an integrated remote controller or a remote controller application which can control the display apparatus 300.

Figure 5:
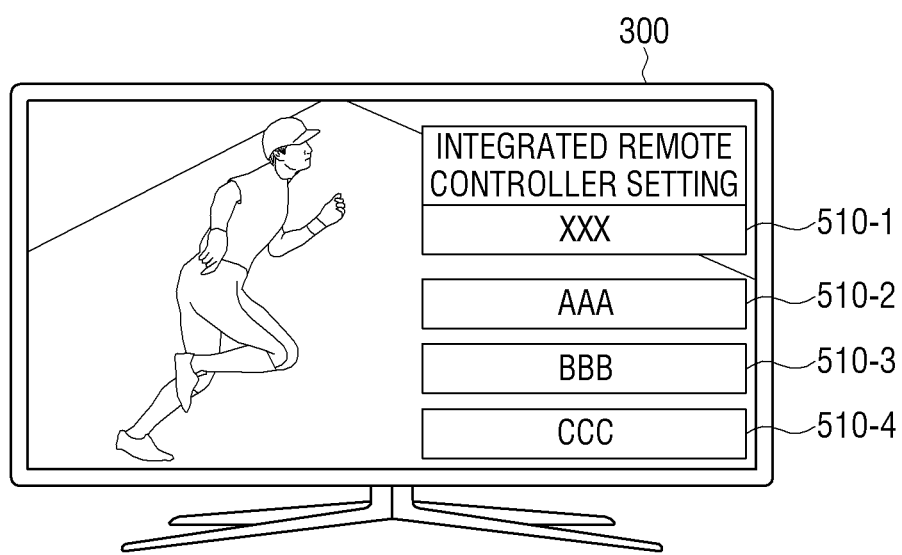
FIG. 5 is a diagram illustrating an example setting change of a remote controller controlling a display apparatus according to an example embodiment.

FIG. 5 is a diagram illustrating an example UI screen for changing a setting of the remote controller 30 controlling the display apparatus 300 according to an example embodiment. Referring to FIG. 5, the UI screen for changing a setting of the remote controller 30 may include a name of provider 510-1 of a broadcast content service that the user subscribes to and types of broadcast receiving apparatuses 510-2 to 510-4 provided by the broadcast content service provider on the currently displayed broadcast content.

Referring to FIG. 5, a user subscribes to a service that the broadcast content service provider "XXX" 510-1 provides and the provider provides three types of broadcast receiving apparatuses such as "AAA" 510-2, "BBB" 510-3 and "CCC" 510-3 to subscribers. Accordingly, when the user selects the broadcast receiving apparatus which is model "AAA" 510-2, the processor 340 may acquire remote controller setting information that can control "AAA" 510-2 from an external and transmit the remote controller setting information to the remote controller 30 of the display apparatus 300.

According to an example embodiment, in case that remote controller information that can control the three types of broadcast receiving apparatuses of "AAA" 510-2, "BBB" 510-3 and "CCC" 510-3 are already received from the external server 20, based on the user's selection "AAA" 510-2, remote controller setting information according to the selection also may be directly transmitted to the remote controller 30 of the display apparatus 300.

By changing the setting of the remote controller 30 of the display apparatus 300, the user may watch a desired broadcast content by manipulating the broadcast receiving apparatus 10 through the remote controller 30 of the display apparatus 300.

The user may subscribe to a plurality of broadcast content service providers and receive broadcast content providing services from a plurality of broadcast receiving apparatuses.

In this example, according to an example embodiment, the circuitry of the broadcast signal inputter 350 may be connected to the plurality of broadcast receiving apparatuses respectively corresponding to the plurality of broadcast content providing services that the user subscribes to and receive a broadcast content from each of the broadcast receiving apparatuses.

In addition, the processor 340 may acquire channel information regarding broadcast contents that the user watched through the plurality of broadcast receiving apparatuses from each of the broadcast receiving apparatuses. For example, even though the broadcast signal inputter 350 can be connected to a plurality of broadcast receiving apparatuses, since it is general for a user to select a broadcast content that is input from one of the broadcast receiving apparatuses, for example, the processor 340 may acquire channel information by matching a broadcast signal inputter selected by the user among the plurality of broadcast signal inputters 350-1 to 350-$n$ and sub-sampling information and acquiring title information.

When a voice keyword of the user is input through the voice inputter 330, the processor 340 may control the communicator 320 to transmit channel information for each of the broadcast receiving apparatuses to the external server 20, together with the voice keyword.

The external server 20 may determine each of the plurality of broadcast content providing services that the user subscribes to based on the channel information from each of the broadcast receiving apparatuses, extract content information related to the voice keyword among content information provided by the determined plurality of broadcast content providing services and transmit the content information to the display apparatus 300.

When the content information related to the voice keyword is received through the communicator 320, the processor 340 may control the display 310 to display the content information related to the received voice keyword.

According to an example embodiment, the external server 20 may transmit information regarding each of the plurality of broadcast content providing services that the user subscribes to, to the display apparatus 300. Therefore, the processor 340 may transmit setting information of a remote controller capable of controlling each of the plurality of broadcast receiving apparatuses to the remote controller 30 of the display apparatus 300, and the remote controller 30 of the display apparatus 300 may receive the remote controller setting information and additionally set setting information of each remote controller that can control each of the broadcast receiving apparatuses.

The user can easily search for and watch a content that he/she wants among a number of broadcast contents provided through the plurality of broadcast content providing services that he/she subscribes to by checking the displayed content information related to the voice keyword and selecting a wanted broadcast content with the remote controller 30 of the display apparatus 300.

Figure 6:
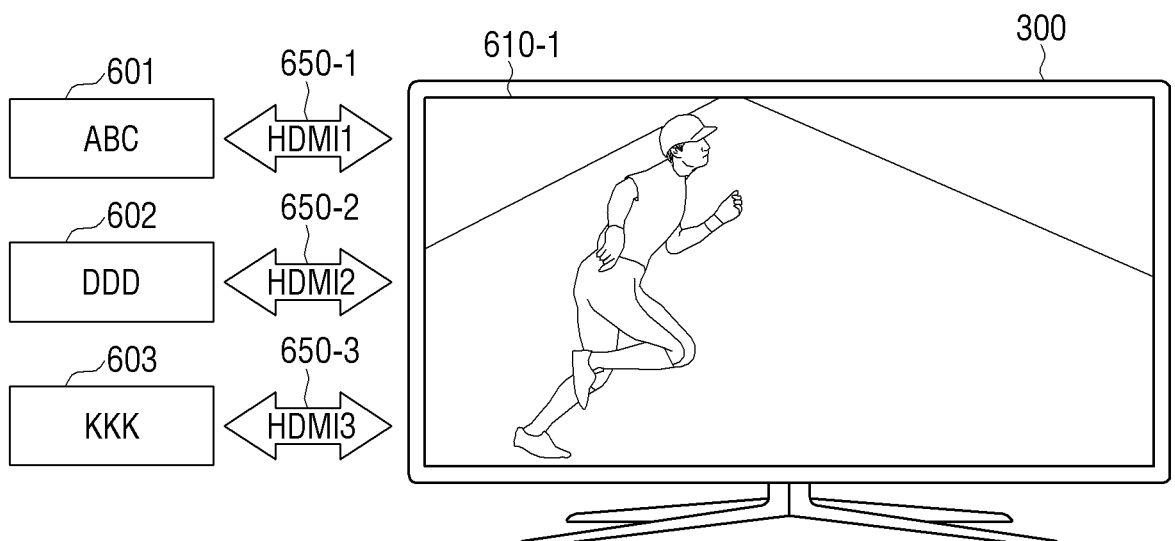
FIG. 6 is a diagram illustrating an example operation of a display apparatus when a plurality of broadcast receiving apparatuses are connected to a display apparatus according to an example embodiment.
Figure 6:
Figure 6:
Figure 6:
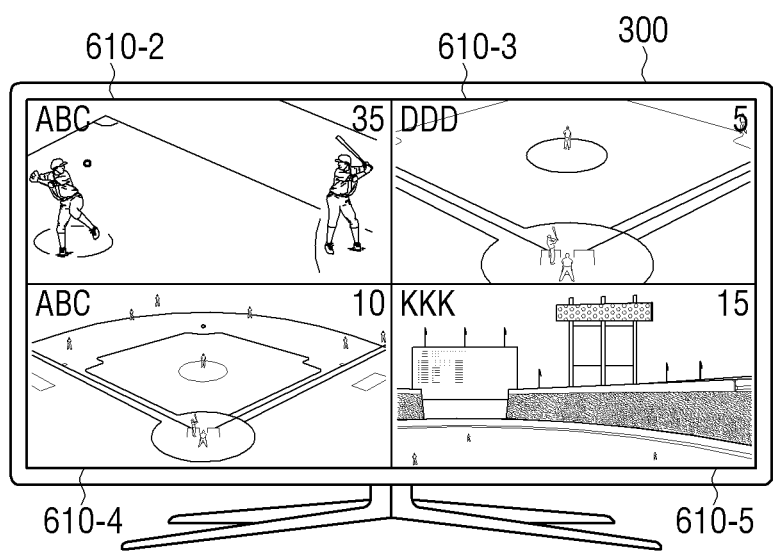

FIG. 6 is a diagram illustrating an example operation of a display apparatus when a plurality of broadcast receiving apparatuses are connected to the display apparatus 300. As described above, FIG. 6 illustrates an operation of a display apparatus after channel information regarding a broadcast content that a user watched is acquired from each broadcast receiving apparatus.

According to FIG. 6, a user subscribes to three broadcast content providing services whose names are ABC, DDD and KKK and uses three broadcast receiving apparatuses 601 to 603 provided by the respective broadcast content service providers by respectively connecting to a first broadcast signal inputter 650-1 to a third broadcast signal inputter 650-3. Even though FIG. 6 illustrates that the first broadcast signal inputter 650-1 to the third broadcast signal inputter 650-3 are all included in an HDMI interface but it is not limited to thereto.

Each of the broadcast receiving apparatuses 601 to 603 receives broadcast contents through different broadcast content providing services that each of the service providers provides and provides the broadcast contents to the display apparatus 300.

In such a situation, when the user utters a voice keyword "aaa" which the user wishes to search and the voice keyword "aaa" is input through the voice inputter 330, the processor 340 controls the communicator 320 to transmit the voice keyword "aaa" and channel information of each of the broadcast receiving apparatuses to the external server 20.

When content information related to the keyword "aaa" is received from the external server 20, the processor 340 may, as illustrated in FIG. 6, display a content which is currently on air among contents related to the voice keyword "aaa." The processor 340 may display information regarding a service name and channel number that provide the broadcast content on each of the displayed broadcast contents.

As illustrated in FIG. 6, based on the content information related to the voice keyword "aaa" received from the external server 20, the processor 340 may determine and display channel 35 610-2 and channel 10 610-4 of ABC, channel 5 610-3 of DDD and channel 15 610-5 of KKK which are current on air among the broadcast contents related to "aaa."

For example, since content information related to a voice keyword can include titles of broadcast contents, channel names that broadcast the broadcast contents, channel numbers, service names, airtime of the broadcast contents, the processor 340 may compare airtime of the broadcast content related to the voice keyword and a current time and determine what broadcast content is currently on air. In addition, the processor 340 may determine what channel provides the broadcast content and what services the broadcast contents provide respectively.

As described the above, the display apparatus 300 may receive information regarding each of a broadcast content providing services that a user subscribes to from the external server 20. Accordingly, the processor 340 may change a setting of the remote controller 30 of the display apparatus 300 by transmitting remote controller setting information capable of controlling each of the plurality of broadcast receiving apparatuses to the remote controller 30 of the display apparatus 300.

The user may, through the remote controller 30 capable of controlling the display apparatus 300, select one of channel 35 610-2 and channel 10 610-4 of ABC, channel 5 610-3 of DDD and channel 15 610-5 of KKK illustrated in FIG. 6.

The user may select one of the channels using a pointer equipped with the remote controller 30 of the display apparatus 30 or a cursor which is displayed on the display apparatus 300 to select one of displayed contents 610-2 to 610-5 displayed. However, it is not limited thereto.

The reason of selecting a channel by using a pointer or a cursor like this is because even if a user selects a wanted channel by pushing a number key equipped with the remote controller 30 of the display apparatus 300, the remote controller 30 of the display apparatus 300 may be in a condition of operating by using remote controller setting information to control the display apparatus 300 or another broadcast receiving apparatus rather than in a condition of operating to control the broadcast receiving apparatus providing a selected channel.

For example, when channel 10 610-4 of ABC is selected, the processor 340 may control broadcast signal inputters 650-1 to 650-3 to select the broadcast receiving apparatus 601 corresponding to an ABC service among a plurality of broadcast receiving apparatuses connected to the broadcast signal inputter 650. Selecting the broadcast receiving apparatus 601 may indicate receiving only the first broadcast signal inputter 650-1 as an input and blocking an input from the second and third broadcast signal inputters 650-2 and 650-3 but it is not limited thereto. Therefore, the channel 10 610-4 of ABC that the user selected may be display on an entire display of the display apparatus 300.

According to an example embodiment, the processor 340 may control the remote controller communicator 390 to transmit information regarding the broadcast receiving apparatus 601 that provides a broadcast content of channel 10 610-4 of ABC selected by the user to the remote controller 30 controlling the display apparatus 300. Accordingly, a mode of the remote controller 30 may be converted to an operating mode by using the remote controller setting information that can control the broadcast receiving apparatus 601 which provides channel 10 610-4 of ABC among setting information of a plurality set remote controllers, and after then, a user may control the broadcast receiving apparatus 601 by using the remote controller 30 of the display apparatus 300.

Figure 7:
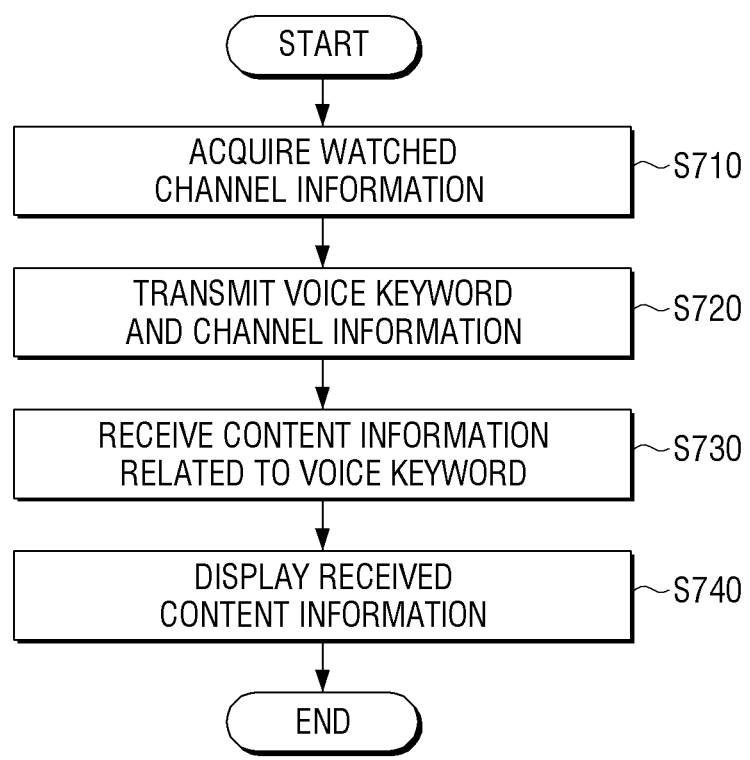
FIG. 7 is a flowchart illustrating an example method of controlling a display apparatus according to an example embodiment.

FIG. 7 is a flowchart illustrating an example method of controlling the display apparatuses 100, 200 and 300 according to an example embodiment. Referring to FIG. 7, a display apparatus may acquire channel information regarding a broadcast content that a user watched through a broadcast receiving apparatus connected with the display apparatus (S710).

For example, the display apparatus may acquire the channel information by sub-sampling a displayed broadcast content and using sub-sampling information.

For example, the display apparatus may transmit the sub-sampling information to the external server 20, receive title information regarding a broadcast content corresponding to the sub-sampling information from the external server 20 and generate channel information based on the received sub-sampling information. However, it is not limited thereto. The display apparatus may receive channel information from the external server 20.

After the channel information regarding the broadcast content that the user watched is acquired, when a voice keyword is input from the user, the display apparatus may transmit information regarding the input voice keyword and the channel information together to the external server 20 (S720) and receive content information related to the voice keyword among content information determined based on the channel information and provided by a broadcast content providing service that the user subscribes to, from the external server 20 (S730).

The display apparatus may display the content information related to the received voice keyword (S740).

The user may check the content information related to the displayed voice keyword, select a desired broadcast content by using a remote controller of the broadcast receiving apparatus 10 and watch the broadcast content.

According to an example embodiment, the display apparatus may receive information regarding the broadcast content providing service that the user subscribes to, together with content information related to the voice keyword from the external server 20.

The information regarding the broadcast content providing service that the user subscribes to may include at least one of information regarding a broadcast receiving apparatus provided by the broadcast content service provider that the user subscribes to and information regarding the remote controller that can control the broadcast receiving apparatus provided from the broadcast content service provider.

The display apparatus may change a setting of the remote controller 30 that controls the display apparatus based on the information on the broadcast content providing service that the user subscribes to. The remote controller that controls the display apparatus may be an integrated remote controller and the information regarding the remote controller may include remote controller setting information such as a remote controller controlling code that can control the broadcast receiving apparatus provided from the broadcast content service provider.

The display apparatus may display a remote controller setting change UI including information regarding the broadcast content providing service that the user subscribes to and change a setting of the remote controller 30 by transmitting the remote controller setting information that can control a broadcast receiving apparatus selected on the UI to the remote controller 30.

According to an example embodiment, a plurality of broadcast receiving apparatuses respectively corresponding to a plurality of broadcast content providing services that the user subscribes to may be connected to the display apparatus. In this example, the display apparatus may acquire channel information regarding broadcast contents that the user watched through the plurality of broadcast receiving apparatuses for each of the broadcast receiving apparatuses.

When the voice keyword is input, the display apparatus may receive content information related to the voice keyword among content information provided by the plurality of broadcast content providing services that the user subscribes to and display the content information.

In addition, the display apparatus may receive information for each piece of the plurality of broadcast content providing services that the user subscribes to from the external server 20 and change a setting of the remote controller 30 of the display apparatus 300 to control each of the plurality of broadcast receiving apparatuses based thereon.

When one channel is selected among channels included in the information related to the voice keyword through the remote controller 30 of which setting is changed, the display apparatus may select a broadcast receiving apparatus that provides a broadcast content of the selected channel among the plurality of broadcast receiving apparatuses and transmit information regarding the broadcast receiving apparatus that provides the broadcast content of the selected channel to the remote controller 30.

FIGS. 8 and 9 are sequence diagrams illustrating example operations of a broadcast content display system according to various example embodiments. Hereinafter, in describing FIGS. 8 and 9, explanations which overlap with the explanations described with FIGS. 1 to 7 may be omitted.

FIG. 8 is a sequence diagram illustrating an example operation of the broadcast content display system according an example embodiment. FIG. 8 illustrates that the display apparatus 100 may be connected to the broadcast receiving apparatus 10 to be provided with a broadcast content from the broadcast receiving apparatus 10 (S800) and display the broadcast content (S805). In addition, the display apparatus 100 may sub-sample the displayed broadcast content (S810) and transmit sub-sampling information to the external server 20 (S815).

The external server 20 determines a broadcast content title according to the sub-sampling information received from the display apparatus 100 (S820) and transmits the determined title information to the display apparatus 100 (S825). As described in the above, finger printing technology among ACR technology may be used but it is not limited thereto.

Accordingly, the display apparatus 100 may generate channel information based on the received title information (S830). The channel information indicates information regarding a title of a broadcast content displayed on the display apparatus 100 at a certain time.

When a voice keyword is uttered from a user and the voice keyword is input (S835), the display apparatus 100 transmits the inputted voice keyword and channel information to the external server 20 (S840) and the external server 20 receives the input voice keyword and the channel information and determines a broadcast content providing service that the user of the display apparatus 100 subscribes to (S845).

When the external server 20 extracts content information related to the voice keyword among contents provided by the service that the user subscribes to and transmits the content information to the display apparatus 100 (S850), the display apparatus 100 displays information related to the received voice keyword (S855).

FIG. 9 is a sequence diagram illustrating an example operation of a content display system according to another example embodiment. For example, FIG. 9 illustrates an operation of the broadcast content display system according to another example embodiment after operation S840.

FIG. 9 illustrates that the external server 20, when a service that a user of the display apparatus 100 subscribes to is determined (S900), transmits information regarding a broadcast content providing service that the user subscribes to in addition to content information related to a voice keyword of the user, to the display apparatus 100 (S910) unlike operation S845 illustrated in FIG. 8.

The display apparatus 100 displays the content information related to the voice keyword received from the external server 20 (S920). In addition, the display apparatus 100 transmits setting information of a remote controller capable of controlling the broadcast receiving apparatus 10 among information regarding the broadcast content providing service that the user subscribes to received from the external server 20 to the remote controller 30 of the display apparatus 100 (S930). According to an example embodiment, the order of operation S920 and operation S930 may be changed.

The remote controller 30 of the display apparatus 100 may change a setting of the remote controller 30 based on the received remote setting information (S940). The setting of the remote controller 30 may, for example, be changed in response to there being a mode changing manipulation from a user on the remote controller 30 or be automatically changed when the remote controller setting information is received from the display apparatus 100.

When the user selects a certain channel by manipulating the remote controller 30 of the display apparatus 100, the remote controller 30 transmits the selected channel number to the broadcast receiving apparatus 10 (S950) and the broadcast receiving apparatus 10 transmits a broadcast content of the selected channel to the display apparatus 100 (S960).

According to the various example embodiments, the user can search for and provided with a broadcast content that he/she wants more quickly. In addition, the user may control various broadcast receiving apparatuses through a remote controller of a display apparatus.

Meanwhile, operations of the processors 240 and 340 of the display apparatuses 200 and 300 or controlling methods of a display apparatus according to the various example embodiments may be generated in software and be loaded in a broadcast receiving apparatus.

For example, a non-transitory computer readable medium may be installed in which a program operating a controlling method of a display apparatus is included, the program including acquiring channel information regarding a broadcast content that a user watched through a broadcast receiving apparatus connected to the display apparatus, in response to a voice keyword being input from the user, transmitting information regarding the input voice keyword and channel information to an external server, receiving content information related to the voice keyword among content information determined based on the channel information and provided by a broadcast content providing service that the user subscribes to from the external server and displaying the content information related to the received voice keyword.

The non-transitory computer readable is a medium that semipermanently stores data can be read by an apparatus. For example, the middleware or programs may be stored in a non-transitory computer readable medium such as a CD, a DVD, a hard disk, a Blu-ray disk, a USB, a memory card, a ROM, etc.

Although the example embodiments of the present disclosure have been illustrated and described, it should be understood that the present disclosure is not limited to the disclosed embodiments and may be variously changed without departing from the spirit and the scope of the present disclosure. In addition, the example embodiments do not limit the technical idea of the disclosure but instead aid in explanation and the scope of the technical idea of the disclosure is not limited by the example embodiments. Therefore, the scope of the protection of the disclosure should be construed by the below claims and it should be interpreted that all technical ideas within the equivalent scope are included in the scope of the disclosure.

What is claimed is:

1. A method of controlling a display apparatus comprising a display, the method comprising:
    displaying on the display a broadcast content received through a broadcast receiving apparatus that is connected to the display apparatus;
    obtaining channel information regarding the broadcast content displayed on the display;
    in response to a voice keyword being input, transmitting information regarding the voice keyword and the channel information to an external server;
    receiving content information related to the voice keyword and information regarding the broadcast content providing service from the external server; and
    displaying the content information related to the voice keyword,
    wherein a broadcast content providing service to which a user of the display apparatus subscribes is identified by the external server based on the channel information transmitted by the display apparatus to the external server,
    wherein the content information is related to a content corresponding to the voice keyword from among a plurality of contents providable by the identified broadcast content providing service,
    wherein the information regarding the broadcast content providing service comprises information regarding a remote controller for controlling the broadcast receiving apparatus, and
    wherein the remote controller is configured to change a setting of the remote controller based on the information regarding the broadcast content providing service received from the display apparatus.

2. The method as claimed in claim 1, wherein the acquiring the channel information comprises sub-sampling a displayed broadcast content and acquiring the channel information using sub-sampling information of the displayed broadcast content which is sub-sampled.

3. The method as claimed in claim 2, wherein the acquiring the channel information using the sub-sampling information comprises:
    transmitting the sub-sampling information to the external server;
    receiving title information regarding the displayed broadcast content from the external server; and
    generating the channel information based on the received title information.

4. The method as claimed in claim 2, wherein the acquiring the channel information using the sub-sampling information comprises:

transmitting the sub-sampling information to the external server; and
receiving the channel information from the external server.

5. The method as claimed in claim 1, wherein the remote controller that controls the display apparatus is an integrated remote controller,
wherein the information regarding the remote controller includes setting information of the remote controller capable of controlling the broadcast receiving apparatus provided by the broadcast content service provider,
wherein the changing the setting of the remote controller comprises:
displaying a remote controller setting change UI including information regarding the broadcast content providing service; and
transmitting the setting information of the remote controller capable of controlling a broadcast receiving apparatus selected on the UI to the remote controller that controls the display apparatus.

6. The method as claimed in claim 5, wherein if a plurality of the broadcast receiving apparatuses respectively corresponding to a plurality of broadcast content providing services to which the user of the display apparatus subscribes, are provided,
the receiving comprises receiving content information related to the voice keyword among content information provided by the plurality of broadcast content providing services, and the method further comprises:
selecting a broadcast receiving apparatus that provides a broadcast content of the selected channel among the plurality of broadcast receiving apparatuses through the remote controller of which the setting is changed in response to a channel being selected among channels included in information related to the displayed voice keyword; and
transmitting information regarding the broadcast receiving apparatus that provides the broadcast content of the selected channel to the remote controller of which setting is changed.

7. A display apparatus, comprising:
broadcast signal input circuitry configured to receive broadcast content from a broadcast receiving apparatus;
a display;
communication circuitry configured to communicate with an external server;
voice input circuitry configured to receive a voice signal including a voice keyword; and
a processor configured to:
control the display to display the broadcast content received through the broadcast signal input circuitry,
obtain channel information regarding the broadcast content displayed on the display,
in response to the voice keyword being input through the voice input circuitry, control the communication circuitry to transmit information regarding the voice keyword and the channel information to the external server, and
receive, through the communication circuitry, information related to the voice keyword and information regarding the broadcast content providing service from the external server,
control the display to display the content information related to the voice keyword,
wherein the broadcast content providing service to which the user of the display apparatus subscribes is identified based on the channel information,
wherein the content information is related to a content corresponding to the voice keyword, from among a plurality of contents providable,
wherein the information regarding the broadcast content providing service comprises information regarding a remote controller for controlling the broadcast receiving apparatus, and
wherein the remote controller is configured to change a setting of the remote controller based on the information regarding the broadcast content providing service received from the display apparatus.

8. The apparatus as claimed in claim 7, wherein the processor is configured to sub-sample the displayed broadcast content and to acquire the channel information using sub-sampling information regarding the displayed broadcast content which is sub-sampled.

9. The apparatus as claimed in claim 8, wherein the processor is configured to control the communication circuitry to transmit the sub-sampling information to the external server and to generate channel information based on received title information in response to title information regarding the displayed broadcast content being received from the external server through the communication circuitry.

10. The apparatus as claimed in claim 8, wherein the processor is configured to control the communication circuitry to transmit the sub-sampling information to the external server and to receive the channel information from the external server.

11. The apparatus as claimed in claim 8, wherein the remote controller that controls the display apparatus is an integrated remote controller,
wherein the information regarding the remote controller includes setting information of the remote controller capable of controlling the broadcast receiving apparatus provided by the provider,
wherein the processor is configured to display a remote controller setting change UI including the information regarding the broadcast content providing service and to control the remote controller communication circuitry to transmit setting information of a remote controller capable of controlling a broadcast receiving apparatus selected on the UI to the remote controller that controls the display apparatus.

12. The apparatus as claimed in claim 11, wherein the broadcast signal input circuitry is configured to receive broadcast contents from a plurality of broadcast receiving apparatuses respectively corresponding to a plurality of broadcast content providing services to which the user of the display apparatus subscribes,
wherein the processor is configured to receive content information related to the voice keyword among content information provided by the plurality of broadcast content providing services through the communication circuitry,
to control the broadcast signal input circuitry to select a broadcast receiving apparatus that provides a broadcast content of the selected channel among the plurality of broadcast receiving apparatuses through a remote controller that controls the display apparatus, in response to a channel being selected among channels included in information related to the displayed voice keyword, and to control the remote controller communication circuitry to transmit information regarding the broadcast receiving apparatus that provides the broadcast content of the selected channel to the remote controller that controls the display apparatus.

13. A broadcast content display system, comprising:
a broadcast receiving apparatus configured to receive a broadcast content and provide the broadcast content to a display apparatus;
a display apparatus configured to display the broadcast content received from the broadcast receiving apparatus, obtain channel information regarding the broadcast content, in response to a voice keyword being input, transmit information regarding the voice keyword and the channel information to an external server, receive information related to the voice keyword and information regarding the broadcast content providing service from the external server, and display the content information related to the voice keyword; and
an external server configured to determine a broadcast content providing service to which a user of the display apparatus subscribes based on the channel information received from the display apparatus, and provide content information corresponding to the voice keyword, from among a plurality of contents provided by the determined broadcast content providing service to the display apparatus,
wherein the information regarding the broadcast content providing service comprises information regarding a remote controller for controlling the broadcast receiving apparatus, and
wherein the remote controller is configured to change a setting of the remote controller based on the information regarding the broadcast content providing service received from the display apparatus.

14. The system, as claimed in claim 13, further comprising:
a remote controller configured to control the display apparatus,
wherein the external server further provides at least one of information regarding a broadcast receiving apparatus provided by a broadcast content service provider subscribed to and information regarding a remote controller capable of controlling the broadcast receiving apparatus provided by the broadcast content service provider to the display apparatus, and
wherein the display apparatus is configured to change a setting of the remote controller that controls the display apparatus using at least one of the information regarding the broadcast receiving apparatus and the information regarding the remote controller.

* * * * *